United States Patent Office 3,582,268
Patented June 1, 1971

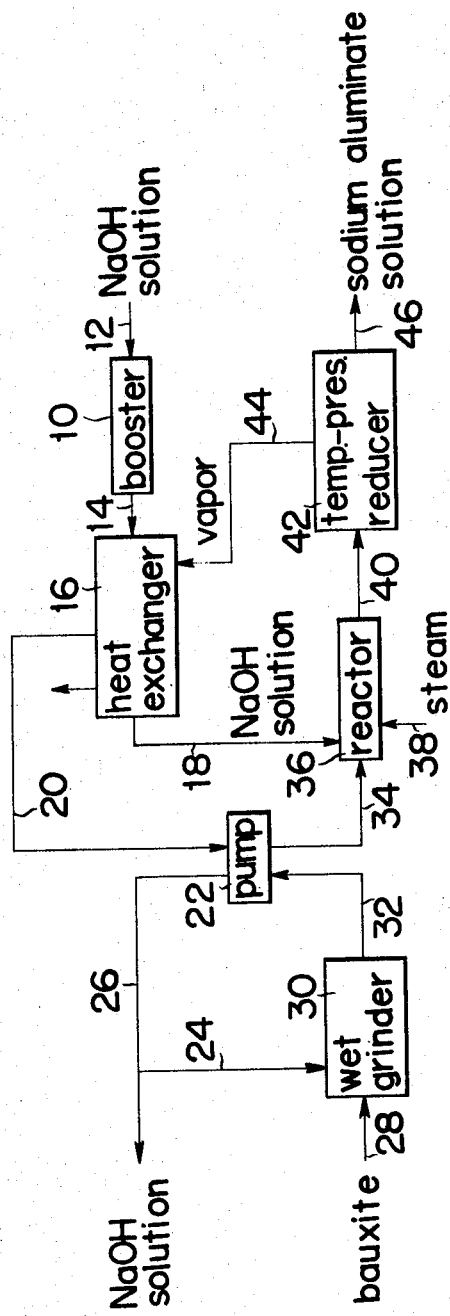

3,582,268
METHOD OF TREATING BAUXITE WITH ALKALI
Chosei Sato and Yasunori Yamada, Yokohama-shi, and Masakatsu Sakamoto, Tokyo, Japan, assignors to Showa Denko K.K., Tokyo, Japan
Filed Oct. 14, 1968, Ser. No. 767,442
Claims priority, application Japan, Oct. 14, 1967, 42/65,696
Int. Cl. C01f 7/02
U.S. Cl. 23—52
2 Claims

ABSTRACT OF THE DISCLOSURE

A method of treating bauxite with alkali in the manufacture of alumina wherein bauxite slurries are introduced into a reactor by a pump operated by a caustic soda solution pressurized for use as a driving medium at a higher pressure than that of the reactor in operation. The caustic soda solution is conducted to a booster to be pressurized for pump operation, and, after leaving the booster, is partly supplied to the reactor to react with the bauxite charged therein.

FIELD OF THE INVENTION

The present invention relates to improvements in a method commonly known as the Bayer process of dissolving bauxite in an alkali solution such as an aqueous solution of caustic soda in manufacturing alumina.

The Bayer process of manufacturing alumina from bauxite involves the step of dissolving ground bauxite ore in an alkali solution such as an aqueous solution of caustic soda. The reaction of dissolving bauxite is normally carried out at a temperature of 120° to 250° C. and a pressure of 3 to 45 kg./cm.$^2$, and may be represented by the following formula:

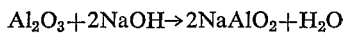

$$Al_2O_3 + 2NaOH \rightarrow 2NaAlO_2 + H_2O$$

Into a dissolving or reaction vessel is introduced ground bauxite in the form of slurry prepared by mixing it with a part of the caustic soda solution used by means of, for example, a slurry pump. At another inlet to the reactor is charged the rest of the caustic soda solution. The bauxite slurry is generally prepared by pulverizing bauxite together with suitable amounts of caustic soda solution in a wet grinder such as a ball mill.

Major problems associated with the bauxite-dissolving operation are, for example, that since the bauxite slurry is remarkably abrasive or corrosive, equipment for pressure transfer thereof, particularly a pump, is readily subject to damage, which becomes more prominent with increasing pressures of the slurry. For instance, application of elevated pressures, say, 10 kg./cm.$^2$ or higher, to effect suitable dissolution is sure to cause severe damage to equipment for conducting the slurry.

The object of the present invention is to provide for treatment of bauxite with an alkali solution a process of introducing bauxite slurry into a reactor at a commercially useful pressure without damaging equipment.

According to the present invention, slurries consisting of fine bauxite particles and a caustic soda solution are charged into a reactor under pressure by a pump operated by a caustic soda solution pressurized for use as a driving medium. To drive the pump, the caustic soda solution is pressurized by a booster, and preferably heated by passing through a heat exchanger. A part of the solution is carried into the pump through an inlet allowing the passage of a pressurized fluid to press the float or piston of the pump. That part of the solution may be introduced into the pump from the delivery side of the booster either without passing through a heat exchanger or by allowing it to pass through a part thereof. The rest of the caustic soda solution from the heat exchanger is directly introduced into a reactor, where the solution is used in producing sodium aluminate by reaction with bauxite. On the opposite side of the pump piston to the incoming caustic soda solution are introduced bauxite slurries obtained by pulverizing bauxite together with a caustic soda solution in a wet grinder, and then conducted to the reactor at an elevated pressure due to the action of the piston pressed down by the pressurized caustic soda solution. Into the reactor is also carried steam to heat the charge thereby to convert the bauxite to sodium aluminate. The aluminate solution formed in the reactor is reduced in pressure and temperature while passing through a means for reducing said pressure and temperature. The recovered steam is conducted and temperature. The recovered steam is conducted to the heat exchanger for use in heating the aforesaid pressurized caustic soda solution. The remaining supersaturated sodium aluminate solution is transferred, for example, to a red mud separating process.

The pump operated by a caustic soda solution advantageously used in the method of the present invention consists of a cylinder, at one end of which is provided a duct for introducing and discharging the caustic soda solution used as a driving medium and at the other another duct for introducing and discharging bauxite slurries, and a float or piston having a circular cross section and such a diameter as will allow a sufficient clearance from the inner wall of the cylinder substantially to prevent the severe friction of bauxite particles with the inner wall of the cylinder and piston when the latter moves through the cylinder. Accordingly, this type of pump is little subject to wear due to the strong abrading action of the bauxite slurry on the cylinder and piston as usually occurring in a conventional recipirocating pump, so that it can conduct the slurry to the reactor at fully elevated pressure without any difficulties. Further, the unavoidable mixing in the pump of small amounts of a caustic soda solution used as a driving medium with the bauxite slurry will only result in the slight dilution of the slurry, causing no substantial obstruction of operation. Even if solids are slightly carried into the driving fluid it will cause no difficulties, because the fluid is used in the wet grinding of bauxite. Details of such pump are already disclosed in the U.S. Pat. 3,306,216. However, the method of the present invention is not restricted by these details of the pump construction, but broadly allows the use of pumps of various designs. For instance, it is permissible to use for the purpose of the present invention a pump which comprises a suitable means, for example, an electromagnetic means for detecting the piston position provided at both top and bottom ends of the piston stroke and a means for controlling the operation of valves for introducing and discharging the pressurized caustic soda solution used as a driving medium and bauxite slurry, using signals issued by said detecting means. However, as far as the method of the present invention is concerned, the piston should have a specific gravity lying between those of the pressurized caustic soda solution used as a driving medium and bauxite slurry introduced into the pump so as to be positioned at the interface between said caustic soda solution and slurry at all times.

In the drawing:

A single figure attached herewith is a flow diagram of the process of dissolving bauxite into alumina in accordance with the present invention.

There will now be described the present invention with reference to the accompanying drawing. Numeral 10 represents a booster, to which is conducted through a pipe 12 a caustic soda solution which has been recovered from the alumina-precipitating process and readjusted to a desired concentration. The caustic soda solution from the booster 10 is divided into two streams. One of them is conducted through a pipe 14 to a heat exchanger 16, where said stream is preheated to a temperature of, for example, 200° C. and transferred therefrom to a reactor through a pipe 18. The other stream is carried through a pipe 20 to an inlet for the driving fluid provided in the cylinder of a pump 22.

The preheating of the caustic soda solution to the greatest possible extent will result in a higher heat efficiency of the entire system, so that it is permissible to branch off part of the driving fluid during passage through the heat exchanger 16. The temperature to which the caustic soda solution should be preheated is determined by its intended use after being discharged from the pump as well as by the operating pressure in the pump cylinder for prevention of boiling.

The caustic soda solution used in driving the pump is further forwarded through a pipe 24 to a wet grinder, and excess amounts of the solution are brought through a pipe 26 back to the booster 10.

For the purpose of the present invention may be used raw bauxite which has been roughly crushed in advance. The raw bauxite is supplied through a suitable feeding means 28 such as a hopper to a wet grinder 30, where the bauxite is ground to form slurries in the presence of the caustic soda solution brought therethrough the pipe 24. The caustic soda solution and raw bauxite may be mixed in the proportions customarily used in this slurry operation, or preferably in the ratio by volume of about 100 parts of caustic soda solution to 100 parts of bauxite. The bauxite slurry obtained is conducted through a pipe 32 to the pump 22, and then through a pipe 34 to a reactor 36 at a pressure (for example, 5 to 50 kg./cm.² or higher) exceeding that of the reactor in operation by the action of the pump. The bauxite slurry usually contains 10 to 20 percent of air bubbles at normal pressure, so that it is preferred for increased efficiency of transport to allow the slurry to pass through a centrifugal pump so as to remove the bubbles before being supplied to the pump 22.

The pressure at which the bauxite slurry is introduced into the reactor 36 depends on the pressure at which the caustic soda solution used as a driving medium is supplied to the pump 22, namely, the pressurizing capacity of the booster 10. And the flow rate of the slurry is related to that of said caustic soda solution. The slurry is conducted to the reactor under pressure by the fall of the piston or float contained in the pump cylinder and having such a cross section as will afford a sufficient clearance from the inner wall of the cylinder. The lower- of the piston is caused by the caustic soda solution brought to the top thereof under pressure for use as a driving medium. When the piston reaches the bottom end of its stroke, the valve on a driving fluid feed pipe and that on a slurry discharging pipe are closed by signals from an electromagnetic means for detecting the piston position at this time, and at the same time a valve on a driving fluid discharging pipe and that on a slurry feed pipe are opened. Under such condition, the slurry from the wet grinder 30 is carried into the cylinder of the pump 22 by a suitable slurry pump to raise the piston. With its rise, the driving fluid in the cylinder is taken outside. When the piston is brought to the top end of its stroke, the aforementioned valves are again operated by signals from another means for detecting the piston position at this time, to cause the piston to be brought down as a result of the influx of the driving fluid and the slurry in the pump cylinder to be forwarded under pressure to the reactor 36. To minimize the pulsating flow rate of the slurry supplied under pressure to the reactor, it is preferred that a plurality of the aforementioned pumps be arranged in parallel. Reduction of such pulsating flows of the slurry will help to stabilize the reactor conditions for producing sodium aluminate.

Into the reactor 36 are introduced under pressure the bauxite slurry through the pipe 34, the caustic soda solution through the pipe 18 and steam through the pipe 38. The reactor 36 is operated at a temperature of 120° to 250° C. and a pressure of 3 to 45 kg./cm.². In the reactor is formed sodium aluminate in accordance with the known reaction mechanism. The aluminate solution produced is conducted through a pipe 40 to a temperature-pressure reducer 42, where the solution is reduced to a temperature of 105° C. and normal pressure. The steam then evolved is forwarded through a pipe 44 to the heat exchanger 16 and the remaining sodium aluminate solution is carried to the succeeding red mud separating process.

According to the present invention, the pressure required in conducting the bauxite slurry to the reactor is supplied through the medium of a caustic soda solution which can be more readily pressurized than the bauxite slurry. This enables the slurry to be sent to the reactor at elevated pressure without any difficulties thereby substantially to eliminate the problem of abrasion which might otherwise occur in a means for pressurized transport of the bauxite slurry, and thus help to reduce the cost of the alumina produced.

What is claimed is:
1. In a method of treating bauxite ore in a reactor with alkali to form a sodium aluminate solution in the manufacture of alumina wherein a bauxite slurry in caustic soda solution is formed and fed to the reactor, the improvement which comprises:
(A) feeding said bauxite slurry as a continuous stream to a pump that consists of a cylinder at one end of which is a first duct for introducing and discharging bauxite slurry, at the other end a second duct for introducing caustic soda and discharging such caustic soda, and a piston of circular cross-section located in said cylinder between said ducts, said piston having a specific gravity lying between the specific gravity of said caustic soda solution and said bauxite slurry, and being of a diameter so as to allow sufficient clearance from the inner wall of the cylinder to substantially prevent severe friction of bauxite particles with the inner wall of the cylinder and piston when the piston moves through the cylinder,
(B) pumping said bauxite slurry as a continuous stream from said first duct of said pump to said reactor at a first pressure in excess of the pressure that prevails in said reactor,
(C) pressurizing a caustic soda solution to a second pressure higher than said first pressure,
(D) feeding said caustic soda at said second pressure to said second duct of said pump and using energy of said pressurized caustic soda solution in said pump to produce said feeding of bauxite slurry from said pump to said reactor, and
(E) supplying caustic soda solution depleted of energy by step (D) to a wet grinder as a medium for forming said bauxite slurry.

2. The method of claim 1 wherein the pressurized caustic soda of step "C" is divided into two streams, one of said streams being fed as specified in step "D" to said pump and the other being conducted via a heat exchanger wherein it is heated to an elevated temperature to said reactor.

References Cited
UNITED STATES PATENTS

| | | | |
|---|---|---|---|
| 2,107,919 | 2/1938 | Turner et al. | 23—52 |
| 3,095,280 | 6/1963 | Soudan et al. | 23—143X |
| 3,306,216 | 2/1967 | Warman | 103—52 |

HERBERT T. CARTER, Primary Examiner

U.S. Cl. X.R.

23—143